United States Patent
Kraft et al.

(10) Patent No.: US 7,539,511 B2
(45) Date of Patent: May 26, 2009

(54) METHOD, SYSTEM AND COMMUNICATION TERMINAL FOR UTILISING A MULTIMEDIA MESSAGING SERVICE FORMAT FOR APPLICATIONS

(75) Inventors: Christian Kraft, Hvidovre (DK); Jesper Meulengracht, Gentofte (DK)

(73) Assignee: Nokia Corporation, Espoo, FL (US)

( * ) Notice: Subject to any disclaimer, the term of this patent is extended or adjusted under 35 U.S.C. 154(b) by 743 days.

(21) Appl. No.: 10/533,283

(22) PCT Filed: Nov. 13, 2002

(86) PCT No.: PCT/IB02/04733

§ 371 (c)(1),
(2), (4) Date: Nov. 30, 2005

(87) PCT Pub. No.: WO2004/045232

PCT Pub. Date: May 27, 2004

(65) Prior Publication Data

US 2006/0154676 A1   Jul. 13, 2006

(51) Int. Cl.
*H04M 1/00* (2006.01)

(52) U.S. Cl. ............... 455/550.1; 455/466; 455/412.1; 455/414.1; 455/418; 455/403; 709/206; 719/318; 348/14.01

(58) Field of Classification Search ............... 455/403, 455/412.1, 414.1, 418–420, 550.1, 556.2, 455/466, 422.1; 709/203, 206–207; 719/318, 719/322; 348/14.01–14.07
See application file for complete search history.

(56) References Cited

U.S. PATENT DOCUMENTS

| | | | | |
|---|---|---|---|---|
| 2002/0160751 A1* | 10/2002 | Sun et al. | .................... | 455/412 |
| 2003/0166405 A1* | 9/2003 | Jauk et al. | .................... | 455/466 |
| 2004/0092272 A1* | 5/2004 | Valloppillil | ................. | 455/466 |
| 2004/0214551 A1* | 10/2004 | Kim | ........................ | 455/412.1 |

FOREIGN PATENT DOCUMENTS

| | | |
|---|---|---|
| EP | 0 804 045 A2 | 3/1997 |
| WO | WO 01/86986 A1 | 5/2001 |

OTHER PUBLICATIONS

Sony Ericsson, "P800 User's Guide, First Edition", Online, Nov. 2002, Retrieved from the Internet: <URL:http://www.sonyericsson.com/downloads/P800_UG_R1c_EN_ZS.pdg>.

"3rd Generation Partnership Project; Technical Specification Group Terminals; Multimedia Messaging Service (MMS); Functional description; Stage 2" (Release 1999), 3GPP TS 23.140 V3.1.0 (Jun. 2002) pp. 1-25.

"Wireless Meets Multimedia—New Products and Services", Yrjo Neuvo, et al., Nokia, IEEE ICIP 2002, pp. I-1-I-4.

* cited by examiner

*Primary Examiner*—Kamran Afshar
(74) *Attorney, Agent, or Firm*—Perman & Green, LLP

(57) ABSTRACT

This invention relates to a method, system and communication terminal for utilizing a MS format for user interfaces for applications running animations or audio-recordings, or showing screen images guiding an operator through a specific menu sequence.

20 Claims, 2 Drawing Sheets

METHOD, SYSTEM AND COMMUNICATION TERMINAL FOR UTILISING A MULTIMEDIA MESSAGING SERVICE FORMAT FOR APPLICATIONS

This application is the National Stage of International Application No. PCT/IB2002/004733, International Filing Date, Nov. 13, 2002, which designated the United States of America, and which international application was published under PCT Article 21(2) as WO Publication No. WO 2004/045232 A1.

FIELD OF INVENTION

This invention relates to a method for utilizing a MMS format for user interfaces for applications such as running animations or audio-recordings, or such as showing screen images guiding an operator through a specific menu sequence. This invention further relates to a communication terminal for executing applications utilizing a MMS format for providing a user with a multimedia assistance during for example the user's maneuvering through a menu.

BACKGROUND OF INVENTION

Lately, communication terminals have evolved to perform, in addition to voice communication, generation and transmission of text messages such as Short Messaging Services (SMS) messages as well as Multimedia Messaging Service (MMS) messages comprising a video, picture or audio sequence. In addition, operators transmit their logo for displaying on the communication terminal in accordance with position of the communication terminal. Furthermore, the communication terminals have evolved to include personal digital assistant (PDA) features such as calendar, address book, and even email functions.

European patent application EP 1 197 901, which hereby is incorporated by reference in the present specification, discloses a hand-portable communication terminal comprising a control unit for running a reminder application and a display for presenting the reminders in a text window. The reminder application enables a user to transmit text reminders to a remote second communication terminal via a wireless network. Preferably these text reminders are transferred via the wireless network included in a message according to the SMS format. The user interfaces for applications run on a communication terminal, however, are generally based on a text format. Although the text format is a simple format, which does not require much processor time, the users of communication terminals demand improved interfaces and multimedia capabilities on their communication terminals.

SUMMARY OF THE INVENTION

An object of the present invention is to provide a communication terminal capable of executing applications utilizing the MMS format for internally storing various multimedia data. The communication terminal may be mobile or cellular phones, personal digital assistants or personal computers, used in a wireless communication network.

A particular advantage of the present invention is provision of user interfaces which guide a user of a communication terminal through a specific sequence of operations.

A particular feature of the present invention relates to the provision of a reminder system enabling a user of a communication terminal to record a reminder on a communication terminal in the MMS format, which reminder thereby may contain a recording of an audio or visual sequence captured by the communication terminal or received at the communication terminal and stored by the user.

The above objects, advantage and feature together with numerous other objects, advantages and features, which will become evident from below detailed description, are obtained according to a first aspect of the present invention by a communication terminal comprising:

a) a control module for executing an application comprising an executable program;
b) a multimedia generating module for generating a recording;
c) storage module for storing said application and for storing said recording in a multimedia format; and
d) a multimedia playing module for playing said recording; and wherein said control module is adapted to associate said recording with said application and to control said multimedia playing module to play said recording in conjunction with said control module executing said application.

The term "a" or "an" should in this context be construed as one or more, or a single or plurality of elements.

The communication terminal according to the first aspect of the present invention may comprise a mobile or cellular phone, a personal office assistant or a personal computer. The communication terminal may be connected to a network such as wireless telecommunication network as well as a wired or wireless computer network such as a local area network (LAN), wide area network (WAN), metropolitan area network (MAN) or an internetwork (e.g. the Internet). Further, the communication terminal may be connected to an over the air (OTA), a cable or satellite television network, or to a power network. In practice, any type of communication network or potential communication network may be used for carrying messages between communication terminals.

The multimedia playing module according to the first aspect of the present invention may be adapted to play the recording either through a display, a loudspeaker, or a combination thereof.

The recording according to the first aspect of the present invention may comprise a text, a series of texts, a picture, a series of pictures, a video sequence, a series of video sequences, an audio track, a series of audio tracks, or any combination thereof. The multimedia format may be a multimedia messaging service (MMS) format. By encapsulating the recording in a MMS format a wide spread of new possibilities in user interfaces is provided.

The application according to the first aspect of the present invention may comprise an executable program such as a power up/down sequence, incoming and outgoing call sequence, call termination sequence, network operator service initiation.

Hence, combining the application and the recording in a MMS format provides an excellent possibility for generating a user interface for, e.g., a powering up sequence of a cellular phone, since the MMS format enables the network operator to provide information to the cellular phone in a multimedia format. Alternatively, the powering up sequence may comprise a multimedia section describing various types of information in regards to for example power left in the cellular phone or reception conditions of the antenna.

The communication terminal according to the first aspect of the present invention may further comprise a calendar module for enabling a user of the communication terminal to generate a reminder as a recording in the multimedia format. The reminder may thus comprise a multimedia message for alerting the user about certain activities. The introduction of an audio or video recording provides a significant improvement to the known types of reminders used in communication terminals, i.e. text type reminders.

The communication terminal according to the first aspect of the present invention may further comprise a media recording module for generating the recording in the multimedia format and for forwarding the recording to the multimedia generating module. The media recording module may comprise an input device such as a camera, a microphone, a keyboard, a scanner, a card reader, a biometric reader such as a fingerprint, iris or voice recognition device, an action sensitive display, or any combination thereof. The recording in the multimedia format for a particular application may be performed directly on the communication terminal. That is, the input device may be adapted to record an audio using a microphone on the communication terminal, an image or series of images using a camera on the communication terminal, or simply a text utilizing a keyboard on the communication terminal. The elements, such as for example a camera, are generally available on cellular or mobile phones developed during the recent years and thus the present invention provides a supplement use of these elements to record reminders to be stored in a calendar.

The communication terminal according to the first aspect of the present invention may further comprise a memory communication device for connecting to an external memory module through an interface device, which external memory module is adapted to store the application and the recording in a multimedia format. External memory should in this context be construed as non-integrated memory, that is the external memory may comprise a memory card such as a secure digital card, a compact flash card, a smart media card, and a multimedia card, read only memory card such as a SIM card or credit card, a smart card or a PC card, or a movable hard or floppy disk drive, or any combination thereof. Since the memory cards have constantly powered non-volatile memory, the data are stable on the cards. Further, since memory cards are solid state media no moving parts are included, and therefore they do not suffer from mechanical difficulties.

The interface device according to the first aspect of the present invention may comprise a wired or wireless connection link. The connection link may be established by a wireless connection such as an infrared connection or a radio frequency modulated connection or a wired one such as provided by a cable. The interface device may be adapted to communicate in accordance with a communication protocol such as bluetooth protocol, a transmission control protocol, Internet protocol, user datagram protocol, or any combination thereof.

Alternatively to generating a personal recording the communication terminal according to the first aspect of the present invention may be connected to a server through a network, such as for example described above. The multimedia generating module may be adapted to receive the recording and/or associated application from the server, which recording and/or application is to be stored in the storage module and played by the multimedia playing module and executed by the control module, respectively. The applications may be updated versions of programs replacing existing outdated versions of programs. By connecting to a server the communication terminal may continuously be updated in regards to providing a communication tool i.e. the communication terminal, which operates according to the most recent and fastest applications.

The above objects, advantage and feature together with numerous other objects, advantages and features, which will become evident from below detailed description, are obtained according to a second aspect of the present invention by a method for utilizing a recording in a multimedia format for an application executed on a communication terminal, and comprising:
(a) generating said recording in a multimedia format by means of a multimedia generating module;
(b) associating said recording with said application by means of said multimedia generating module;
(c) storing said recording and said application by means of a local storage module on said communication terminal; and
(d) executing said application and playing said recording by means of a control module and a media playing module.

The generation of a recording according to the second aspect of the present invention may comprise receiving multimedia data from a server over a network and converting the multimedia data to the recording by means of the multimedia generating module. Alternatively or additionally, the generation of a recording may comprise receiving multimedia data from a multimedia recording module of the communication terminal and converting the multimedia data to the recording by means of the multimedia generating module. The method significantly improves applications to be run or communicated to a communication terminal since the user interface associated with an application may be supplied with multimedia support such as images, video or audio.

The term "executed" should in this context be construed as run or played on the communication terminal. The application per se may in fact be executed on a server, while the communication terminal provides the user interfaces on the associated display.

The multimedia format application according to the second aspect of the present invention may comprise a multimedia messaging service (MMS) format. The MMS format provides a standardized format for handling multimedia messages to be communicated between communication terminals interconnected through a wireless telecommunication network.

The generation of the recording in a multimedia format according to the second aspect of the present invention may comprise capturing multimedia data by means of an input device and sequencing the multimedia data. The multimedia data may be captured using any form of digital or digitized analog recording apparatus. The multimedia data may be transferred to a communication terminal or server utilizing any type of wired or wireless connection. The multimedia data may in fact as described with reference to the first aspect of the present invention be recorded by a communication terminal, this in effect, provides great versatility since each user of a communication terminal may generate personal applications such as for example reminders.

The method according to the second aspect of the present invention may incorporate any feature of the communication terminal according to the first aspect of the present invention.

The above objects, advantage and feature together with numerous other objects, advantages and features, which will become evident from below detailed description, is obtained according to a second aspect of the present invention by a system for utilizing a recording in a multimedia format for an application executed on a communication terminal, and comprising:
(a) a communication terminal comprising:
(i) a control module for executing an application comprising an executable program;
(ii) a multimedia generating module for generating a recording;

(iii) storage module for storing said application and for storing said recording in a multimedia format; and (iv) a multimedia playing module for playing said recording; and wherein said control module is adapted to associate said recording with said application and to control said multimedia playing module to play said recording in conjunction with said control module executing said application; and (b) a server for generating and forwarding said application and/or said recording to said communication terminal over communication network.

The system according to the third aspect of the present invention may incorporate any features of the communication terminal according to the first aspect of the present invention and any features of the method according to second aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments reference is made to the accompanying drawings which form a part hereof, and in which, by way of illustration, various embodiments are shown, in which the invention may be practiced. It is to be understood that other embodiments may be utilized and structural and functional modifications may be made without departing from the scope of the present invention.

Figure 1:
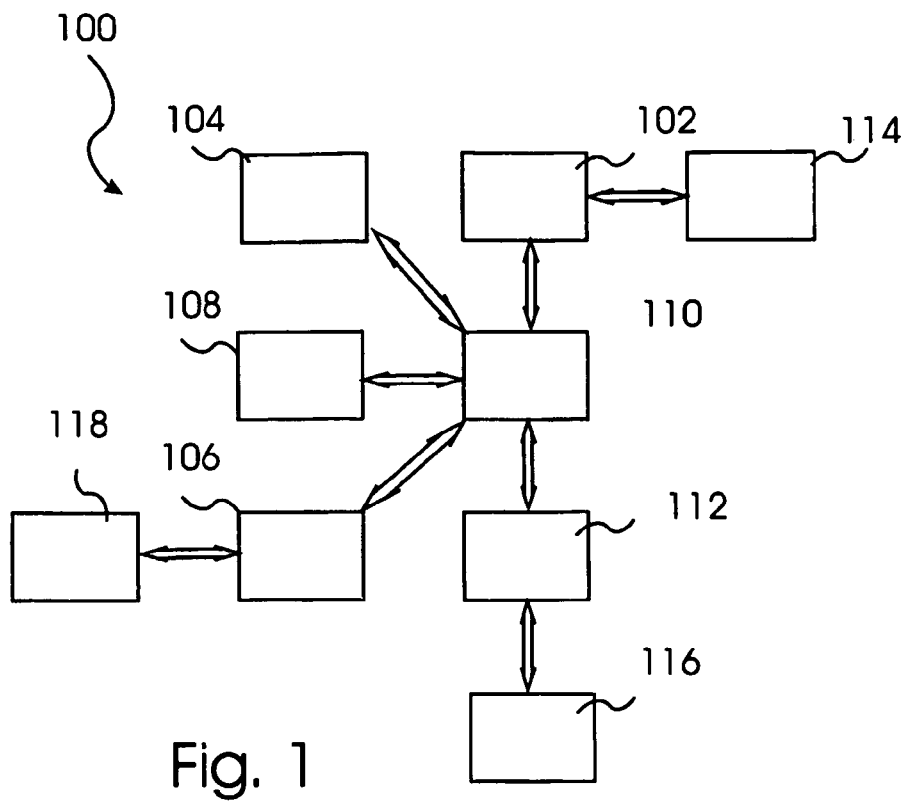
FIG. 1 shows a communication terminal according to a preferred embodiment of the present invention.

A communication terminal according to a presently preferred embodiment of the present invention is shown in FIG. 1 as designated in its entirety by reference numeral 100. The communication terminal 100 comprises a messaging module 102 for transmitting and receiving any types of data packages through a wireless communication network; a calendar module 104 for enabling a user of the communication terminal 100 to perform general calendar operations, such as storing or retrieving any form of time related data e.g. alerts, meetings or special days; a media playback module 106 for outputting a recording either by display or loudspeaker or a combination thereof; a storage module 108 for storing recordings in a multimedia format; and a control module 110 for executing an application in conjunction with the media playback module 106 outputs an associated recording.

The calendar module 104 cooperates with a media generating module 112 through the control module 110 for generating and associating a recording in a multimedia format such as the MMS format with an application to be executed by the control module 110. The media generating module 112 receives a recording from a keyboard, a microphone, a camera, a scanner, a card reader, an iris reader, a fingerprint reader, an action sensitive display, or any combination thereof, which is designated in entirety by reference numeral 116. Alternatively, the media generating module 112, as will be described below with reference to FIG. 2, receives the recording from a server providing multimedia data to be associated with a specific application. The multimedia data may be a text, a series of texts, a picture, a series of pictures, a video sequence, a series of video sequences, an audio track, a series of audio tracks, or any combination thereof.

Figure 2:
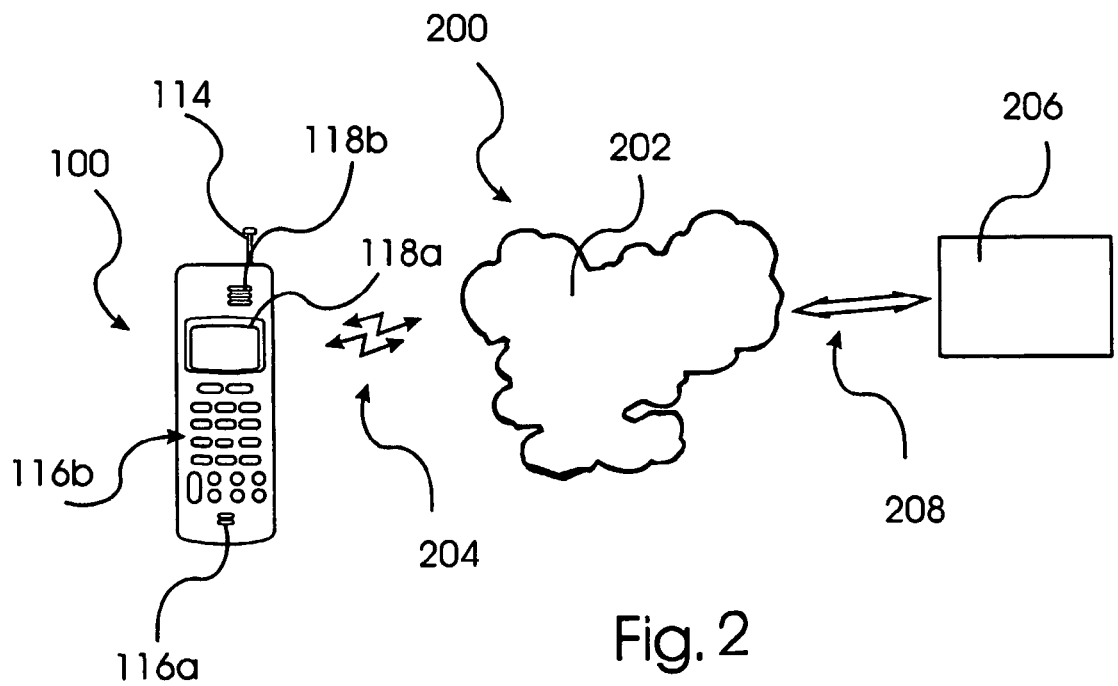
FIG. 2 shows a communication system according to a preferred embodiment of the present invention.

FIG. 2, shows a communication system designated in entirety by reference numeral 200 and comprising the communication terminal 100, as described with reference to FIG. 1, communicating through a communication network 202 with a server 206.

The communication terminal 100 comprises an antenna 114 for connecting to a communication network 202 such as wireless telecommunication network as well as a wired or wireless computer network such as a local area network (LAN), wide area network (WAN), metropolitan area network (MAN) or an internetwork (e.g. the Internet). Further, the antenna 114 may be connected to an over the air (OTA), a cable or satellite television network, or to a power network.

The server 206 is connected to the communication terminal 100 through the communication network 202 via a first wireless link 204 and a second wired or wireless link 208. The server 206 provides applications and associated recordings in multimedia format, which are to be stored in the storage module 108 of the communication terminal 100 and to be executed by the control module 110 and by the multimedia playing module 106. The applications and associated recordings may be updated versions of programs replacing existing outdated versions of programs. By connecting to the server 206 the communication terminal 100 is continuously updated. The communication tool 100 is thereby continuously enabled to operate according to the most recent and fastest applications.

For example if the communication terminal 100 needs an updated application, maybe because the present power up sequence installed on the communication terminal 100 is determined by a clock function limiting use of the communication terminal 100, then the server 206 provides an updated application to the communication terminal 100 through the communication network 202. Furthermore, the server 206 upon request from the communication terminal 100 may forward a wide variety of applications to be stored on the storage module 108. The applications and associated multimedia data may be games or new features for existing applications on the communication terminal 100.

Figure 3:
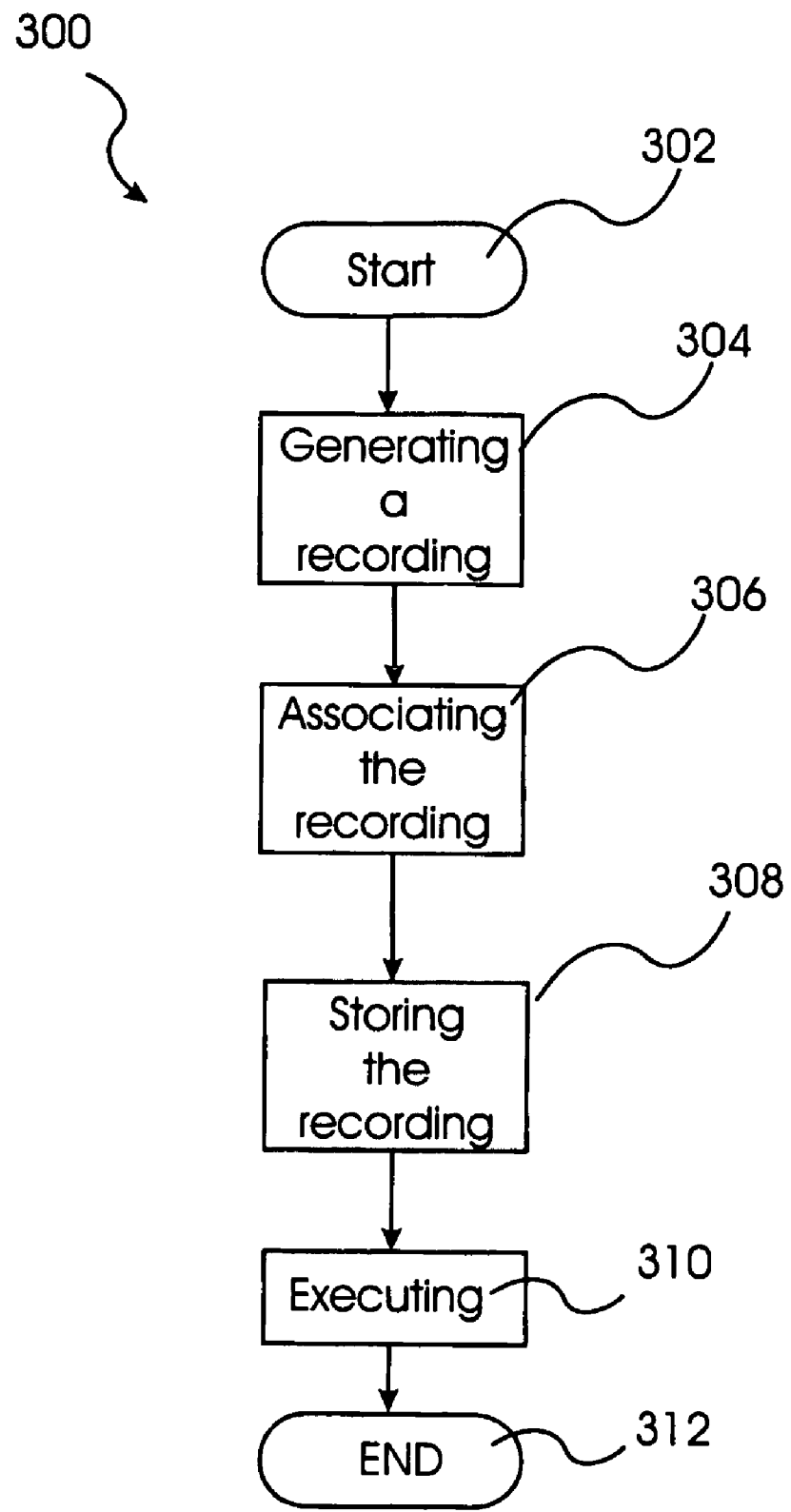
FIG. 3 shows a flow chart of a method according to a preferred embodiment of the present invention.

FIG. 3 shows a flow chart of a method according to the presently preferred embodiment of the present invention designated in entirety by reference numeral 300. The method 300 comprises a start 302 level during which the fundamental requirements such as file format and implementation procedure is established.

Furthermore, the method 300 comprises a generation procedure 304 for generating a recording in a multimedia format and an association procedure 306 for associating the recording with an application to be run in a communication terminal. The generation procedure 304 comprises receiving multimedia data such as a text, a series of texts, a picture, a series of pictures, a video sequence, a series of video sequences, an audio track, a series of audio tracks, or any combination thereof. The association procedure 306 comprises determination of association of the multimedia data with an application. That is the association procedure 306 links the multimedia data to the application.

The method 300 further, during a storing procedure 308, stores the recording in the multimedia format and the application in a memory. The memory may be a local memory integrated on a communication terminal such as a cellular phone, or an external memory, for example, on a server. The local memory may be an erasable as well as static type memory or both types. In case the recording is stored on the external memory, the recording will be forwarded to the communication terminal, when the communication terminal requests this.

The method 300 further comprises a executing procedure 310 for playing the recording in the multimedia format in association with the executing of the application. Hence the communication terminal may present a multimedia interface for a user, while the user for example is powering up his cellular phone. In addition, the communication terminal enables the user to record a message and store the message in a multimedia format locally on the communication terminal, which message may be associate with a reminder application. That is, the reminder application utilizes the multimedia format such as MMS to store a reminder, which may comprise a message containing multimedia data.

Finally, the method 300 comprises a termination procedure 312 during which the method 300 makes itself available for generation of further multimedia format applications.

The invention claimed is:

1. A communication terminal comprising:
    a) a multimedia generating module for generating a recording in a multimedia format;
    b) a calendar module for enabling a user of said communication terminal to generate a reminder in said multimedia format;
    c) storage module for storing said reminder, and for storing said recording in a multimedia format;
    d) a control module for executing said reminder comprising an executable program; and
    e) a multimedia playing module for playing said recording, and wherein
    said control module is adapted to associate said recording with said reminder and to control said multimedia playing module to play said recording in conjunction with said control module executing said reminder.

2. A communication terminal according to claim 1, comprising a mobile or cellular phone, a personal digital assistant, a personal computer, or any combination thereof.

3. A communication terminal according to claim 1, being adapted to connect to a network such as wireless telecommunication network as well as a wired or wireless computer network such as a local area network (LAN), wide area network (WAN), metropolitan area network (MAN), internetwork, or any combination thereof.

4. A communication terminal according to claim 3, wherein said communication terminal is adapted to connect to a server through said network.

5. A communication terminal according to claim 4, wherein said communication terminal is adapted to receive said recording and/or reminder from said server, which recording and/or reminder is to be stored in said storage module and played by said multimedia playing module and executed by said control module, respectively.

6. A communication terminal according to claim 1, being adapted to connect to an over the air (OTA), a cable or satellite television network, a power network, or any combination thereof.

7. A communication terminal according to claim 1, wherein said recording comprises a text, a series of texts, a picture, a series of pictures, a video sequence, a series of video sequences, an audio track, a series of audio tracks, or any combination thereof.

8. A communication terminal according to claim 1, wherein said multimedia format is a multimedia messaging service (MMS) format.

9. A communication terminal according to claim 1, wherein said reminder comprises an executable program such as a power up/down sequence, incoming and outgoing call sequence, call termination sequence, network operator service initiation, or any combination thereof.

10. A communication terminal according to claim 1, wherein said media recording module comprises an input device such as a camera, a microphone, a keyboard, a scanner, a card reader, a biometric reader, an action sensitive display, or any combination thereof.

11. A communication terminal according to claim 1, further comprises a memory communication device for connecting to an external memory module through an interface device, which external memory module is adapted to store said reminder and said recording in a multimedia format.

12. A communication terminal according to claim 11, wherein said external memory module comprises a memory card such as a secure digital card, a compact flash card, a smart media card, and a multimedia card, read only memory card such as a SIM card or credit card, a smart card or PC card, or a movable hard or floppy disk drives, or any combination thereof.

13. A communication terminal according to claim 12, wherein said interface device is adapted to communicate in accordance with a communication protocol such as bluetooth protocol, a transmission control protocol, Internet protocol, user datagram protocol, or any combination thereof.

14. A communication terminal according to claim 11, wherein said interference device comprises a wired or wireless connection link.

15. A method for utilizing a recording in a multimedia format as a reminder for a calendar application executed on a communication terminal, and comprising:
    (a) generating said recording in said multimedia format by means of a multimedia generating module;
    (b) associating said recording with said reminder by means of a control module;
    (c) storing said recording and said reminder by means of a storage module on said communication terminal; and
    (d) executing said reminder and playing said recording by means of said control module controlling a multimedia playing module.

16. A method according to claim 15, wherein said generating a recording comprises receiving multimedia data from a server over a network and converting said multimedia data to said recording by means of said multimedia generating module.

17. A method according to claim 15, wherein said generating a recording further comprises receiving multimedia data from a multimedia recording module of said communication terminal and converting said multimedia data to said recording by means of said multimedia generating module.

18. A method according to claim 15, wherein said multimedia format reminder comprises a multimedia messaging service (MMS) format.

19. A method according to claim 15, wherein said multimedia data is transferred to said communication terminal or server utilizing any type of wired or wireless connection.

20. A system for utilizing a recording in a multimedia format as a reminder for a calendar application executed on a communication terminal, and comprising:
    (a) said communication terminal comprising: (i) a control module for executing said reminder comprising an executable program;

(ii) a multimedia generating module for generating a recording in said multimedia format;
(iii) storage module for storing said reminder and for storing said recording in said multimedia format; and
(iv) a multimedia playing module for playing said recording; and wherein said control module is adapted to associate said recording with said reminder and to control said multimedia playing module to play said recording in conjunction with said control module executing said reminder; and (b) a server for generating and forwarding said reminder and/or said recording to said communication terminal over communication network.

* * * * *